April 9, 1957  C. A. TUDBURY  2,788,425
HIGH-FREQUENCY INDUCTOR ARRANGEMENT
Filed March 17, 1951  3 Sheets-Sheet 1

INVENTOR.
CHESTER A. TUDBURY
BY Alfred G. Body
ATTORNEY

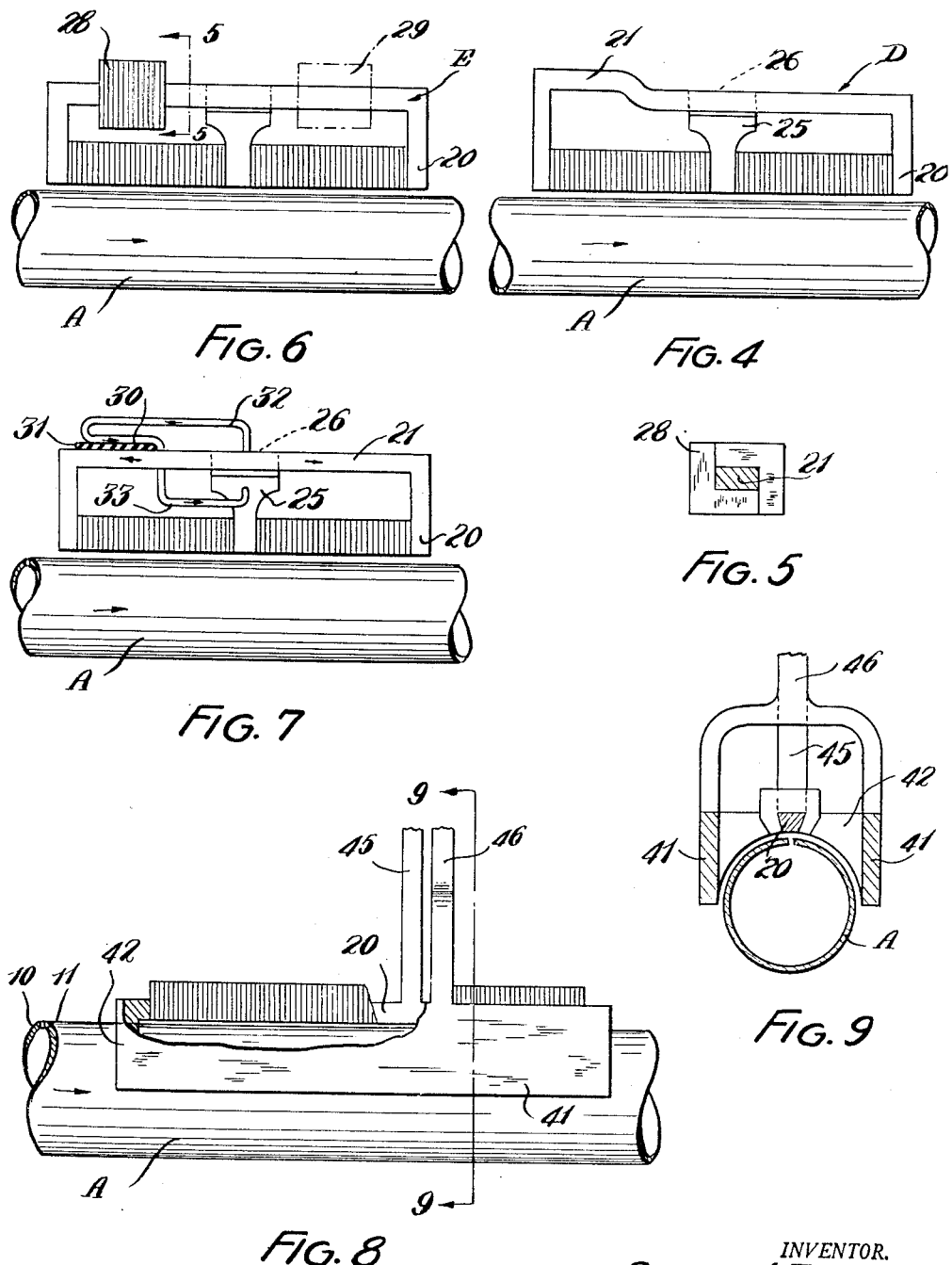

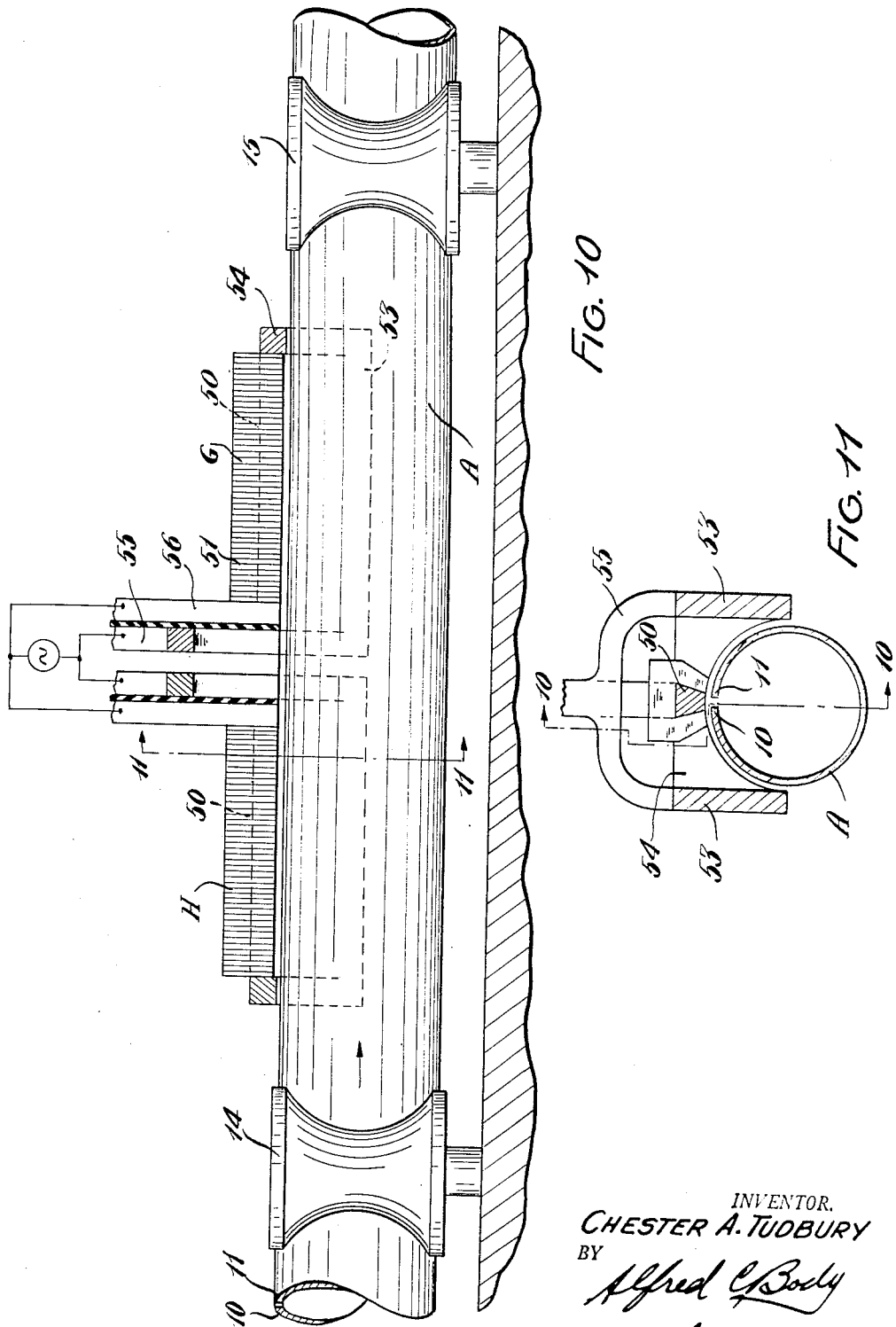

United States Patent Office 2,788,425
Patented Apr. 9, 1957

2,788,425

HIGH-FREQUENCY INDUCTOR ARRANGEMENT

Chester A. Tudbury, Cleveland, Ohio

Application March 17, 1951, Serial No. 216,194

11 Claims. (Cl. 219—10.53)

This invention pertains to the art of electrical high-frequency induction heating and, more particularly, to a high-frequency inductor arrangement for heating longitudinal lengths of elongated workpiece.

The invention is paricularly adapted to equipment for continuous seam welding of the edges of metallic strip into pipe or tube using high-frequency induction heating to heat the edges to the welding temperature and, for the purpose of clarity, will be described with particular reference to such equipment, although the invention is useful elsewhere. The use of high-frequency induction heating and suitable inductors for heating the edges have been clearly set forth and described in the copending applications of Phillips N. Sorensen, Serial No. 58,228 filed November 4, 1948 now Patent No. 2,632,840 and Serial No. 86,066 filed April 7, 1949, now abandoned. The present invention provides improvements on inductors of this type for accomplishing the objects of the invention.

In the art of continuous seam welding, flat strip is formed by suitable rolls into a closed tube with the edges in closed spaced opposed relationship. The edges are then heated to a welding temperature by high-frequency induction heating. Then the tube is passed through welding rolls which press the heated edges into pressure-welding engagement, the entire operation being done continuously and at rather high rates of speed. A typical installation now in use continuously welds at tube speeds of around 200 feet per minute using approximately 300 kws. of 10,000 cycle per second electrical energy.

As described in the above referred to application, the high-frequency inductors include a main conductor which is disposed immediately over the edges of the tube to be heated and one or more side or return conductors which are disposed remotely from the edges and generally adjacent the sides of the tube. High-frequency currents flowing in the main conductor induce highly-concentrated, high-frequency currents to flow longitudinally in each edge immediately underneath the conductor. It has been estimated that these currents, for the conditions above referred to, are in the neighborhood of 8,400 amperes and flow in a very narrow width adjacent the edges to produce a very rapid and concentrated heating effect. The return-current path is, according to the above referred to applications, in the portions of the tube remote from the edges. These currents, while generally of the same magnitude as the current in the edges themselves, are spread out over a large part of the circumferential width of the tube and do not produce any appreciable heating.

Excellent welds have been produced at high speeds of movement of the tube using inductors of this type. However, difficulty has been experienced with unduly short life of the bearings which support the forming and welding rolls.

As a result of the present invention, I have discovered that the ideal current flow described above which it was thought resulted with the inductors as above described did not actually result and that some of the concentrated main heating currents in the edges, instead of returning in the portions of the tube remote from the edges, actually flowed longitudinally of the tube beyond the ends of the inductor, the return path being formed through the forming and welding rolls and the metallic base of the seam-welding machine. These currents flow through the bearings supporting the rolls and, either by electrolysis or arcing or otherwise, deteriorated the surfaces of the bearing and radically shortened their life.

This current flow may be due to a number of reasons which now seem quite apparent but required much thought and experimental work before becoming s For example, the electrical resistance of the side walls of the tube under the inductor is extremely low and it was thought that all of the return currents would, obviously, follow this path as a return path. However, upon further analysis, it appears that the welding machine itself, that is, the welding rolls, the forming rolls and the base of the machine, form an electrical circuit in parallel with the side walls of the tube. The electrical resistance of this circuit may be much higher than that of the side walls of the tube; but, even with as great a difference as twenty times, with a total return-current flow in excess of 8,000 amperes, the electrical circuit through the machine would carry currents in excess of 400 amperes. Another reason to which the return-current flow through the welding machine itself may be attributed is the fact that the main heating conductor normally has a much higher degree of electrical coupling with the tube than the side conductors; i. e., the side conductors have a higher leakage reactance than the main conductor which shows up as currents flowing through the electrical circuit formed by the base of the machine itself and the rolls. A combination of both factors or others may also be present.

It has been proposed to use rolls which are electrically insulated from the base or to divide the base under the inductor and electrically insulate the two sections or to provide other forms of electrical insulation on the seam-welding equipment, but any one of these solutions would involve major redesigning and reconstruction of the seam-welding equipment and would, in any event, be quite expensive.

The present invention contemplates means and method for overcoming all of the above difficulties and eliminating or mitigating the flow of current through the workpiece supporting, forming and welding rolls which is simple, inexpensive and dependable in operation.

In accordance with the invention, there is provided, for heating narrow longitudinal lengths of elongated workpieces supported on spaced workpiece supports electrically connected to each other by a supporting base, a balanced high-frequency inductor arrangement which induces concentrated, generally equal, high-frequency heating currents to flow at any one instant in opposite directions in longitudinally spaced portions of the workpiece. The inductor arrangement, in one aspect of the invention, includes the combination of two generally identical, aligned, high-frequency inductors connected to either the same power source; or a pair of in-phase, equi-frequency power sources; the longitudinal lengths of each inductor; or the coupling of each to the workpiece; or the energization of each being so adjusted as to induce equi-heating currents in the workpiece which are 180 degrees out of phase. Equivalently, more than two inductors could be employed. Alternatively, the inductor arrangement may be a unitary inductor having a continuous elongated heating leg and one or more return legs, all extending longitudinally of the workpiece, the high-frequency electrical energy being fed or tapped into the legs between the ends thereof, the point of feed being adjusted along the length of the legs so as to equalize the currents induced in the workpiece by the portions of the legs on each side of the point of feed, reactances in the return legs being used for further adjusting, or the taps may be at the mid point of the legs and reactances employed in the return legs on one side of the tap to effect the desired induced-current distribution.

The reactances may include magnetic material about the return legs on one side of the tap, an energized coil coupled with one side of the return leg or a greater spacing of one return leg from the heating leg than the spacing of the other side of the return leg.

If the workpiece is stationary relative to the inductor arrangement, the invention provides for the inductors or taps to be generally symmetrical. If the workpiece is moving longitudinally of the inductor, the temperature of the edges under the inductor increases from cold at the entrance end to the welding temperature at the exit end which causes a variation in the coupling of the heating leg to the workpiece and the invention provides for different heating currents to be flowing in the two inductors or on each side of the tap so that the differences in coupling are compensated for and equal induced currents flow.

The principal object of the invention is the provision of a new and improved high-frequency inductor arrangement which is simple in construction, electrically efficient and which induces opposite-flowing, balanced, longitudinal heating-current flow in an elongated workpiece such that there are no stray currents to flow through the workpiece supports.

Another object of the invention is the provision of a new and improved high-frequency inductor arrangement for heating narrow longitudinal lengths on elongated workpiece which comprises, in combination, a pair of generally similar inductors in aligned relationship relative to the workpiece and so energized that the current in corresponding parts of the two inductors flows in opposite directions.

Another object of the invention is the provision of a new and improved high-frequency inductor arrangement for heating narrow longitudinal lengths on elongated workpieces which comprises a high-frequency inductor having an elongated heating leg adapted to be in close spaced parallel relationship with the portion of the workpiece to be heated and one or more return legs, the inductor being energized at points intermediate the ends of the main heating and return legs, whereby the heating leg has opposite-flowing currents therein.

Another object of the invention is the provision of an inductor of the type referred to wherein the power leads are connected to points intermediate the ends of the heating and return legs to so proportion the length of the legs on each side of the point of feed that equi, opposite-direction, induced currents flow in the workpiece.

Another object of the invention is the provision of a new and improved continuous seam-welding machine comprising, in combination, spaced forming and welding rolls adapted to progressively advance the tube to be welded and a high-frequency inductor arrangement disposed between the rolls and adapted to be in electrically coupled relationship with the tube, the inductor arrangement comprising an elongated heating leg extending in a direction between the rolls and having high-frequency currents flowing therein in opposite directions, the currents in each direction being so proportioned that heating currents induced in the tube will be generally equal and opposite.

The invention will be specifically set forth and defined in the claims. The invention may, of course, take physical form in a number of equivalent but different-appearing parts and arrangements of parts, and preferred embodiments of such arrangements will be described in detail in this specification and illustrated in the accompanying drawing which is a part hereof, and wherein:

Figure 1 is a side elevational view of a continuous tube seam-welding machine having an inductor arrangement embodying the present invention, portions of the inductor being broken away for the purposes of clarity;

Figures 2 and 3 are cross-sectional views of Figure 1 taken approximately on the lines 2—2 and 3—3 thereof respectively;

Figures 4, 6, 7, 8 and 10 are side elevational views of alternative embodiments of the invention shown in Figure 1;

Figure 5 is a cross-sectional view of Figure 6 taken approximately on the line 5—5 thereof;

Figure 9 is a cross-sectional view of Figure 8 taken approximately on the line 9—9 thereof; and Figure 11 is a cross-sectional view of Figure 10 taken approximately on the line 11—11 thereof, Figure 10, in turn, being a sectional view taken approximately on the line 10—10 of Figure 11.

Figure 1:
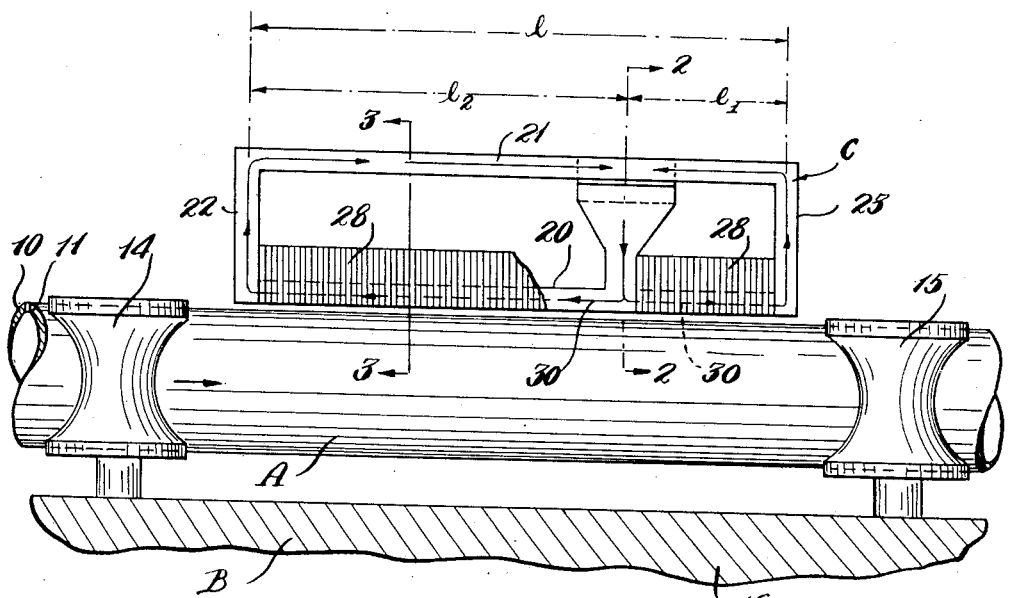

Referring now to the drawings wherein the showings are for the purposes of illustrating preferred embodiments of the invention only and not for the purposes of limiting the invention, Figure 1 shows a workpiece in the form of a length of C-shaped tube A having edges 10, 11 to be heated and welded, which tube is moving from left to right through workpiece supports in the form of a continuous seam-welding machine comprised of opposed pairs of forming and welding rolls 14, 15 respectively rotatably supported on a base 16 shown as continuous between the rolls 14, 15, although, of course, it may be formed in a plurality of pieces joined together by one means or another. The forming and welding rolls 14, 15 are longitudinally spaced and a high-frequency inductor arrangement C constructed in accordance with the present invention is positioned between these rolls in inductive relationship with the tube A.

The tube A may be of any known or desired shape and is shown, for the purposes of convenience, as being round. The tube may be formed of any known metallic material but, for the purposes of this invention, will be described as being of low-carbon steel which, as is well known, is magnetic at temperatures below about 1,300° F. and non-magnetic above this temperature, the temperature being known as the "Curie" point or temperature.

The details of the machine B form no part of the present invention and, for the purposes of simplicity, only a single pair of forming rolls 14 and a single pair of welding rolls 15 are shown. There will necessarily be more forming rolls and there may be more sets of welding rolls. The forming and welding rolls are normally supported relative to the base 16 by means of roller bearings not shown and either or both sets of rolls may be power driven by power means also not shown.

The tube A generally leaves the forming rolls 14 with the edges 10, 11 in slightly spaced relationship, passes under the inductor C where the edges are heated rapidly to a forge-welding temperature and then the tube passes through the welding rolls 15 where the edges are pressed into a forge-welding relationship, the entire process being continuous and done at high speeds of movement in excess of 100 feet per minute.

The inductor C comprises generally an elongated, straight, main heating conductor 20 which extends longitudinally of the tube A in close-spaced, parallel, and symmetrical relationship to the edges 10, 11. In addition to the conductor 20, the inductor C includes a return conductor 21 connected at its ends to the ends of the main heating conductor 20 by short, vertically-extending legs 22, 23, the conductor 21 extending in spaced parallel relationship to the conductor 20 on the side thereof remote from the edges 10, 11.

The conductor 20 connects to a source of high-frequency electric energy 24 through a fish-tail lead 25 which is brazed to the upper surface of the conductor 20 at a point intermediate its ends. As shown, this fish-tail lead extends vertically upwardly from the conductor 20 to a point just spaced below the lower surface of the return conductor 21 and then extends at right angles to one side of the inductor. The return conductor 21 is energized through a fish-tail lead 26 brazed to one side thereof on a line aligned with the point of attachment of the fish-tail lead 25 to the main heating conductor 20 and which extends to one side of the inductor in close spaced, parallel relationship with the right-angle extension of the fish-tail lead 25. These fish-tail leads 25, 26 connect to a power source 24 through an impedance-matching transformer of conventional construction, not shown. Generally, this transformer will be mounted on the base 16 and provides, at least in part, the physical support for the inductor C relative to the tube A.

The conductors 20, 21, 22, 23 and the fish-tail leads 25, 26 are shown as being of solid metallic material for the purposes of simplicity. In actual practice, these conductors would have a hollow construction so that cooling water may be continuously circulated therethrough so as to remove any heating in the conductor caused by the high currents which flow through an inductor of this type. As shown, the cross-sectional shape of the main heating conductor 20 is generally that of a trapezoid with the shorter of the parallel sides being adjacent the edges 10, 11. The main heating conductor has, over its entire length, except at the point where the fish-tail lead 25 connects thereto, a stack of generally U-shaped, magnetically-permeable laminations 28, the ends of the legs of the U being positioned adjacent or facing the tube A while the base of the U extends over the sides of the conductor 20 remote from the edges 10, 11.

In operation, high-frequency currents flow through the inductor C. While the direction of the flow of these currents in the inductor C is continuously reversing at the frequency of the power source, if the flow of these currents at any one instant be examined, the flow of these currents will be as indicated by the arrow 30 which shows the current flowing into the inductor through the fish-tail lead 25 into the main heating conductor 20 where the current divides, in a proportion as will be presently explained, and flows in both directions away from the fish-tail lead 25 into the end conductor 23 and then toward each other in the return conductor 21 to the fish-tail lead 26 where the currents recombine and flow outwardly to the power source 24. These currents, as stated, generate high-frequency flux fields which thread into the tube A and generate currents in the edges 10, 11, the currents flowing in opposite directions under the respective portion of the main conductor 20 on each side of the fish-tail lead 25. With tubes of nonmagnetic metals, these opposite-flowing currents are generally equal in magnitude so that each counteracts the tendency of the other to cause a stray current flow through the workpiece supports. Explained otherwise, the voltage drop in the edges 10, 11 measured in one direction from a point under the fish-tail lead 25 is the same but of opposite sign from the voltage drop measured in the other direction, so that the net voltage difference beyond the ends of the inductor is zero. With tubes of magnetic material, the amount of currents which this flux induces to flow in the edges 10, 11 depends, to a considerable extent, on the magnetic condition of the edges 10, 11; that is to say, when the edges 10, 11 are cold, they are magnetic and the flux links readily through the edges generating the desired current. However, after the edges have heated to approximately 1,300° F., the "Curie" point of the steel, the edges lose their magnetic properties, and the same current in the conductor 20 will generate smaller currents in the edges. As the tube A advances under the inductor, the edges progressively heat and adjacent the entrance side of the inductor, will be below the Curie point; while adjacent the exit side, will be well above the Curie point. The result is that if the fish-tail leads were symmetrically positioned, equal and opposite currents will not be generated in the edges 10, 11.

The present invention contemplates locating the point of connection of the fish-tail leads 25, 26 to the conductors 20, 21, respectively, so that the induced currents will be equal and opposite regardless of the change in electrical characteristics of the edges. In the embodiment shown, the point of attachment of the fish-tail leads 25, 26 has been displaced toward the right or exit end of the inductor. The effect of moving the point of attachment of the fish-tail leads in this direction is to lower and increase the reactance of the portion of the inductor to the right and left, respectively, of the fish-tail leads and to thereby increase the ratio of the current flowing in the right-hand side of the main conductor to the ratio of the current flowing in the left-hand side of the inductor. The over-all effect is to cause equal currents to be induced in the edges 10, 11 but flowing in opposite direction. Stray currents are inherently eliminated.

The amount of offset of the point of attachment of the fish-tail leads 25, 26 cannot be specified as a definite ratio inasmuch as the amount of offset depends, inter alia, upon the characteristics of the material from which the tube A is made and its speed of movement from left to right. For example, if the tube A were stationary, then the point of attachment should be at the mid point of the inductor C because the edges under the inductor will all reach the Curie point at the same time. However, if the tube A commences to increase its speed in moving from left to right, it will be appreciated that the point on the edges where the Curie point is reached will advance toward the right-hand side of the inductor C. The point of attachment of the fish-tail leads 25, 26 must, therefore, be varied accordingly. A ratio of one to two is believed to be satisfactory for most present-day continuous seam-welding applications of ordinary low-carbon steels. If nonmagnetic materials are being welded, the fish-tail leads can be more symmetrically arranged, the amount of offset being only that necessary to compensate for changes in resistance of the edges as they heat.

In many installations, the slight unbalance caused by changes in resistance or magnetic characteristics of the edges may be disregarded.

Inductors of the type shown in Figure 1 are normally formed of rigid construction, all the joints being carefully brazed and with the water-cooling fittings provided. Alteration of the point of attachment of the fish-tail leads after the inductor is once constructed to correct for errors in calculations or to compensate for changes in tube speed is a major task, often requiring reconstruction of the entire inductor. Oftentimes, it is cheaper to build an entirely new inductor.

The present invention contemplates, as alternative embodiments, inductor arrangements whereby the ratio of the current flowing in the sides of the main conductor on each side of the point of attachment of the fish-tail lead may be readily controlled or may be varied after the inductor is constructed and in actual operation so as to compensate for variations in the induced currents caused by differences in the shapes of the various tubes, variations in the speed of movement thereof, variations in the wall thickness in the tube, or variations in the magnetic characteristics of the metal forming the tube. Thus, in Figure 4, an inductor D is shown which is generally identical with the inductor shown in Figure 1, except that the fish-tail leads 25, 26 connect to the mid point of the conductors 20, 21. The ratio of currents in the main conductor 20 on both sides of the fish-tail lead tap are controlled by varying the reactance of one side of the return conductor 21. Thus, in Figure 6, the return conductor 21 has on the left-hand side of the point of attachment of the fish-tail lead 26 a stack of magnetic laminations 28 which completely surround the conductor 21. Variations in the length of this stack will vary the ratio of the current in the two halves of the conductor 20.

An alternative construction comparable to Figure 4 would be a long copper sleeve 29 about the right-hand side of the fish-tail leads 25, 26 in electrically insulated relationship thereto. The effect of such a copper sleeve would be to provide a length of zero flux about this portion of the return leg, therefore lowering the reactance of the right-hand side of the inductor and increasing the current flowing therein.

Figure 6 shows a high-frequency inductor E generally identical in construction with the inductors of Figures 1 and 4, except that the increase in reactance of the inductor to the left of the point where the fish-tail leads connect into the inductor has been obtained by increasing the spacing of at least a part of the left-hand side of the return conductor 21 from the main heating conductor 20. This increase in spacing is obtained by an offset 21'. The length or amount of this offset may be varied to compensate for variations in the tube A. In a like manner, the point of attachment of the fish-tail leads 25, 26 may be positioned other than at the mid point of the inductor.

Figure 7 shows a still further alternative construction, the inductor there shown having a conductor 30 extending parallel and in close spaced relationship to a portion of the return conductor 21 to the left of the point of attachment of the fish-tail leads 25, 26 and insulated from the conductor 21 by a layer of insulation 31. The left-hand end of the conductor 30 connects to the fish-tail lead 26 by means of a conductor 32 while the right-hand end of the coil 30 connects to the mid point of the fish-tail lead 25 by a short length of conductor 33. By controlling the phasing of the currents in the conductor 30 relative to the current in the conductor 21, greater or lesser amounts of voltage may be induced in the conductor 21, thus controlling the currents in the left-hand side of the inductor which, in all of the embodiments shown, is the approach side of the inductor.

Figures 2, 3:
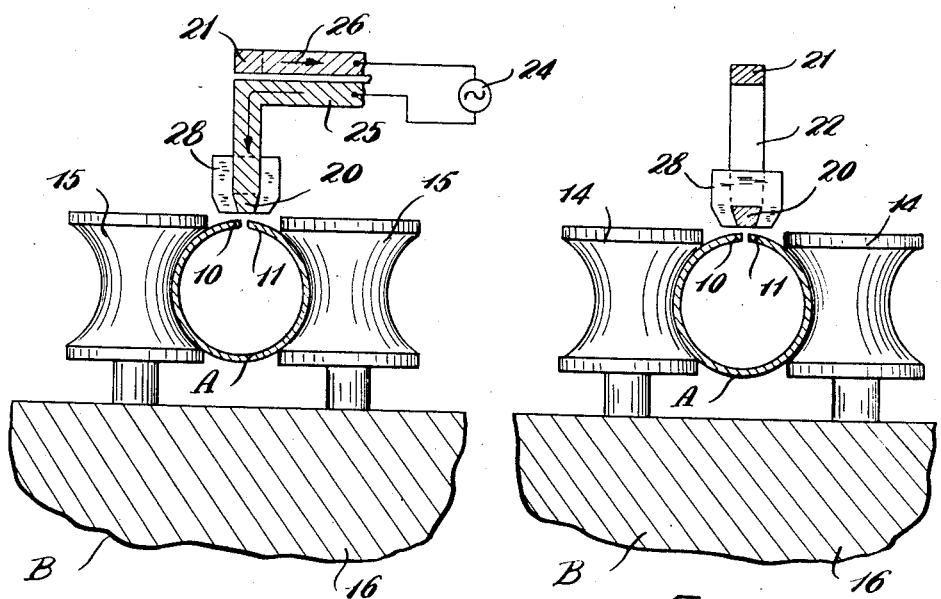

Figures 8 and 9 show still further alternative embodiments of the invention. In this embodiment, the inductor is comprised of a main heating conductor 20 which is identical in construction to the main heating conductor shown in Figures 1 to 3. This inductor also comprises a pair of side conductors 41 which extend in parallel relationship with the main conductor 20 except that the increase in reactance of the inductor to the left of the point where the fish-tail leads connect into the inductor has been obtained by increasing the spacing of at least a part of the left-hand side of the return conductor 21 from the main heating conductor 20. This increase in spacing is obtained by an offset 21'. The length or amount of this offset may be varied to compensate for variations in the tube A. In a like manner, the point of attachment of the fish-tail leads 25, 26 may be positioned other than at the mid point of the inductor.

Figure 7 shows a still further alternative construction, the inductor E there shown having a multiturn coil 30 wound about the portion of the return conductor 21 to the left of the point of attachment of the fish-tail leads 25, 26 and insulated from the conductor 21 by a sleeve or insulation 31. The left-hand end of the coil 30 connects to the fish-tail lead 26 by means of a conductor 32 while the right-hand end of the coil 30 connects to the mid point of the fish-tail lead 25 by a short length of conductor 33. By controlling the phasing of the currents in the coil 30 relative to the current in the conductor 21, greater or lesser amounts of voltage may be induced in the conductor 21, thus controlling the currents in the left-hand side of the inductor which, in all of the embodiments shown, is the approach side of the inductor.

Figures 8 and 9 show still further alternative embodiments of the invention. In this embodiment, the inductor is comprised of a main heating conductor 20 which is identical in construction to the main heating conductor shown in Figures 1 to 3. This inductor also comprises a pair of side conductors 41 which extend in parallel relationship with the main conductor 20 and overlap both sides of the tube A. The corresponding ends of the conductors 20, 41 are connected together by end conductors 42, the lower surface of which is generally curved to conform to the circumference of the outer surface of the tube A. In this embodiment of the invention, the conductor 20 is energized by a fish-tail lead 45 extending vertically upwardly from the upper surface of the conductor 20 at a point midway between its ends. The side conductors 41 are energized at approximately the same plane as the energization of the conductor 20 by a fish-tail lead 46, which, at the base, is in the form of an inverted U, the ends of the U being brazed or otherwise rigidly attached to the upper edges of the side conductors 41. The point of attachment of the fish-tail leads 45, 46 is offset from the mid point of the inductor by an amount to compensate for the speed of movement of the tube A and the variations in the magnetic condition of the edges 10, 11 under the main heating conductor 20.

Figures 10 and 11 show a still further alternative embodiment of the invention wherein the inductor arrangement is comprised of generally identical right- and left-hand high-frequency inductors G, H so arranged and energized from a power source that the currents induced in the edges 10, 11 under each inductor will be in opposite directions and of approximately the same magnitude. In this embodiment, each inductor comprises a main heating conductor 50 having magnetic laminations 51 thereabout in the same manner as described with reference to the preferred embodiment. Each inductor also has a pair of side conductors 53 interconnected at the outer ends by an end conductor 54 and with the corresponding end of the main heating conductor 50. The other ends of the side conductors 53 extend slightly beyond the end of the main heating conductor 50 and, there, connects to the lower ends of an inverted U forming one of the fish-tail leads 55 for the inductor. The corresponding end of the main heating conductor 50 connects to a vertically-extending fish-tail lead 56 which extends in spaced parallel insulated relationship with the fish-tail lead 55. As shown, the right-hand inductor has a fish-tail lead positioned on the left-hand end thereof while the left-hand inductor has a fish-tail lead on the right hand thereof. The fish-tail leads 55, 56 are then connected in parallel such that the direction of the flow of the currents in corresponding members will at all times be in opposite directions. These inductors may be energized from the same power source or from separate power sources; but, if separate power sources are employed, means should be provided for controlling the phase relationship of the currents flowing in the inductors. In a like manner, if desired, the fish-tail leads could connect to the outer ends of these inductors.

The relative length of the two inductors may also be varied so as to make the currents which each induce in the edges 10, 11 to be equal and opposite, or the inductors may be made of the same length and other means provided for adjusting the currents flowing therein.

The invention has been described with reference to preferred and alternative preferred embodiments. Obviously, the invention may take physical form in other physical embodiments which may be equivalent to those described herein and it is my intention to include all such alternative embodiments insofar as they come within the scope or are the equivalent of the appended claims.

Having thus described my invention, I claim:

1. An inductor arrangement for heating elongated longitudinal lengths on elongated workpieces comprising an elongated main heating conductor and a return conductor connected in parallel relationship and means for simultaneously energizing both of said conductors intermediate their ends.

2. A high-frequency inductor arrangement comprising an elongated main heating conductor adapted to be disposed in close spaced parallel relationship with an elongated workpiece, at least a return conductor electrically connected to the ends of said main conductor and a pair of power leads, one connected intermediate the ends of each of said main and said return conductor adapted to be connected to a source of high-frequency energy whereby currents in said conductors on both sides of the points of connection of said power leads are in opposite directions.

3. A high-frequency inductor arrangement for continuously heating the opposed edges of a continuously longitudinally moving generally C-shaped tube to the welding temperature, said inductor arrangement comprising an elongated main conductor adapted to be disposed in close spaced parallel relationship with said edges and at least a return conductor electrically connected to the ends of said main conductor and a pair of power leads connected one to each said main conductor and said return conductor intermediate the ends thereof, the point of connection of said power leads being offset from the mid point of the respective conductor a distance proportional to the speed of movement of the tube.

4. In apparatus of the type described, a seam-welding machine comprising a base and opposed pairs of rolls rotatably supported thereon and adapted to advance a tube having edges to be heated to the welding temperature, a high-frequency inductor disposed between pairs of said rolls, said inductor comprising a main heating conductor adapted to be disposed in closed spaced parallel relationship to the edges to be heated, said inductor also including a return conductor electrically connected to the ends of said main heating conductor and means for energizing said inductor comprising a fish-tail lead electrically connected to said main heating conductor intermediate the ends thereof and a fish-tail lead connected to said return conductor intermediate the ends thereof.

5. The combination of claim 4 wherein the point of attachment of the fish-tail leads to the respective conductors is offset from the mid point of the inductor in a direction of the movement of the tube in an amount corresponding to the speed of movement of the tube such that the currents induced in the edges by the main heating conductor on each side of the point of feed will be equal and opposite in direction.

6. In apparatus of the type described, a continuous seam-welding machine comprising a base and forming and welding rolls rotatably supported thereon and adapted to advance a tube to be welded continuously from the forming rolls to the welding rolls, a high-frequency inductor arrangement comprising, in combination, a pair of high-frequency inductors, each inductor including a main heating conductor each aligned with the other, said inductors each including return conductors electrically connected to one end of said main conductor and fish-tail leads connecting to the other ends of said conductors and to an equi-frequency power source.

7. A seam-welding machine for continuously welding spaced edges on an elongated length of generally C-shaped metallic tubing comprising, in combination: a base, spaced workpiece supports on said base and adapted to advance said tube at a predeterminable rate of speed between said supports, a high-frequency inductor disposed between said supports, said inductor including an elongated longitudinally-extending main heating conductor adapted to be in close spaced parallel relationship to the edges to be heated and means for energizing said conductor intermediate its ends so that currents, at any one instant, flow in opposite directions in said conductor, the point of energizing being offset from the midpoint of said conductor in a direction of movement of said tube in an amount such that the opposite flowing currents in said conductor induce equal currents in the edges.

8. A seam-welding machine for continuously welding spaced edges on an elongated length of generally C-shaped metallic tubing comprising, in combination: a base, spaced workpiece supports on said base and adapted to advance said tube at a predeterminable rate of speed between said supports, a high-frequency inductor disposed between said supports, said inductor including an elongated longitudinally-extending main heating conductor adapted to be in close spaced parallel relationship to the edges to be heated and means for energizing said conductor intermediate its ends so that currents, at any one instant, flow in opposite directions in said conductor, said inductor also including a return conductor electrically connected to the ends of said main conductor and means for energizing said return conductor intermediate the ends thereof.

9. A seam-welding machine for continuously welding spaced edges on an elongated length of generally C-shaped metallic tubing comprising, in combination: a base, spaced workpiece supports on said base and adapted to advance said tube at a predeterminable rate of speed between said supports, a high-frequency inductor disposed between said supports, said inductor including an elongated longitudinally-extending main heating conductor adapted to be in close spaced parallel relationship to the edges to be heated and means for energizing said conductor intermediate its ends so that currents, at any one instant, flow in opposite directions in said conductor, said inductor also includes a return conductor connected to the ends of said main conductor, means for feeding electrical energy to said return conductor intermediate the ends thereof and reactance means about the portion of said return conductor on the approaching end of said tubing for reducing the flow of current in that portion of the inductor facing the direction from which the tube moves.

10. A high-frequency inductor comprising a generally elongated rectangular loop of electrically-conductive material including at least one generally elongated straight conductor adapted to be in close spaced heating relationship with an elongated workpiece to be heated and a return conductor in generally parallel spaced relationship with said first-mentioned conductor and means for energizing said conductors comprising a pair of power leads connected one to each of said conductors intermediate the ends thereof.

11. A high-frequency inductor comprising an elongated generally straight heating leg adapted to be in close spaced relationship with portions of an elongated workpiece to be heated and a pair of side legs in spaced parallel relationship with said first-mentioned leg and end legs electrically interconnecting corresponding ends of said main leg in said side legs and means for energizing said inductor intermediate the ends of said legs, said means comprising a power lead connected intermediate the ends of said side legs and another power lead connecting to said main leg intermediate the ends thereof.

References Cited in the file of this patent

UNITED STATES PATENTS

| | | |
|---|---|---|
| 2,460,687 | Fuchs | Feb. 1, 1949 |
| 2,493,950 | Dow et al. | Jan. 10, 1950 |
| 2,582,955 | Body | Jan. 22, 1952 |
| 2,582,963 | Cachat | Jan. 22, 1952 |
| 2,583,227 | Neidigh | Jan. 22, 1952 |
| 2,632,079 | Body | Mar. 17, 1953 |

FOREIGN PATENTS

| | | |
|---|---|---|
| 616,063 | Great Britain | Jan. 14, 1949 |